United States Patent [19]

Kolfertz

[11] 4,162,876
[45] Jul. 31, 1979

[54] ELECTROMAGNETICALLY DRIVEN DIAPHRAGM PUMP

[76] Inventor: Erwin Kolfertz, Bebelallee 9, Solingen-Merscheid, Fed. Rep. of Germany, 5650

[21] Appl. No.: 756,695

[22] Filed: Jan. 4, 1977

[30] Foreign Application Priority Data

Jan. 28, 1976 [DE] Fed. Rep. of Germany ....... 2603098
Oct. 7, 1976 [DE] Fed. Rep. of Germany ....... 2645175

[51] Int. Cl.$^2$ .............................................. F04B 43/00
[52] U.S. Cl. ......................................... 417/413; 310/25
[58] Field of Search .................. 417/410, 412, 413; 310/21, 29, 32, 36, 25

[56] References Cited

U.S. PATENT DOCUMENTS

| | | | |
|---|---|---|---|
| 2,228,565 | 1/1941 | Haddaway | 417/412 |
| 2,301,870 | 11/1942 | Hancock, Jr. | 310/29 |
| 2,471,796 | 5/1949 | Thiberg | 417/413 |
| 2,483,086 | 9/1949 | Coake | 310/32 |
| 2,509,210 | 5/1950 | Clark | 310/25 |
| 2,547,027 | 4/1951 | Winkler | 310/25 |
| 2,594,749 | 4/1952 | Ehrat et al. | 310/25 |
| 2,788,170 | 4/1957 | Kato et al. | 310/25 |
| 2,793,293 | 5/1957 | Ehrlinger et al. | 310/25 |
| 2,946,218 | 7/1960 | Karpchuk | 310/25 |
| 3,066,611 | 12/1962 | Schwartmann et al. | 417/413 |
| 3,522,460 | 8/1970 | Spurlin | 310/29 |
| 3,539,276 | 11/1970 | Matsura | 417/413 |
| 3,545,894 | 12/1970 | Lovitz | 417/412 |
| 3,746,478 | 7/1973 | Willinger | 417/413 |
| 3,825,374 | 7/1974 | Kondo | 417/413 |
| 3,830,596 | 8/1974 | Kondo | 417/413 |

FOREIGN PATENT DOCUMENTS

1074732  2/1960  Fed. Rep. of Germany ............ 310/29

Primary Examiner—Carlton H. Croyle
Assistant Examiner—Edward Look
Attorney, Agent, or Firm—Toren, McGeady and Stanger

[57] ABSTRACT

A diaphragm pump having a diaphragm which is movable to and fro by an oscillating arm which is in turn driven by an electromagnet has its oscillating arm so mounted that it oscillates in a plane which is perpendicular to the principal lines of force of the magnetic field produced by the electromagnet and parallel to pole faces of the electromagnet. Preferably the electromagnet has a core which is substantially E-shaped with the ends of the arms of the E forming the pole faces and the oscillating arm oscillates in a plane perpendicular to the plane of the E. The oscillating arm is preferably mounted by means of a leaf spring to enable it to oscillate and the leaf spring is fixed to a bearing block projecting from a base plate which also carries the electromagnet.

26 Claims, 9 Drawing Figures

ELECTROMAGNETICALLY DRIVEN DIAPHRAGM PUMP

This invention relates to diaphragm pumps having a diaphragm movable to and fro by an oscillating arm which is driven by an electromagnet. The pumps are intended, for example, for the aeration of aquaria.

The operating noise of electromagnetically-operated diaphragm pumps, especially of those used for aerating aquaria, should be as low as possible. To this end, in a diaphragm pump disclosed in German Gebrauchsmuster Specification No. 7,132,711, the pump casing is divided longitudinally to create an air pressure balancing chamber. By this means, a continuous air delivery is obtained instead of a pulsating delivery, so that the air delivered leaves the pump at a substantially uniform pressure and thus produces negligible noise. This pump has an oscillating arm which moves between the poles of an electromagnet.

In another electromagnetically-operated diaphragm pump, which is disclosed in German Gebrauchsmuster Specification No. 7,325,922, an oscillating arm which is pivotally mounted at one end in a housing, moves towards and away from the electromagnet and, during pumping, a noisy mechanical striking of the oscillating arm against the pole piece of the electromagnet takes place.

To overcome this disadvantage, an oscillating armature motor has been developed, as disclosed in German Patent Specification No. 1,074,732, wherein an armature furnished with comb-like teeth swings to and fro into and out of mesh with a correspondingly slit pole piece of an electromagnet. It is intended that this shall prevent the armature from striking the surface of the electromagnet in its limiting position. Since these oscillating armature motors are driven at a frequency, which is twice as high as the frequency of the alternating current by which the electromagnet is excited, a pronounced humming noise is produced.

To overcome this disadvantage also, an electromagnetic oscillating armature motor for driving a diaphragm pump is proposed in the said Specification No. 1,074,732, wherein the armature of the motor is equipped with window-like openings. These openings permit free swinging of the armature beyond suitably shaped pole ends of the electromagnet of the motor which is connected through a half-wave rectifier to an alternating current supply. Mechanical striking of an oscillating arm of the pump against the electromagnet is prevented by the window-like openings in the armature and oscillating arm and to this extent therefore a reduction in noise is obtained. However, this construction, like the other known solutions, suffers from the disadvantage that the armature is pulled towards the principal axis of the electromagnet and of the electromagnetic field, so that a very large installed height of the diaphragm pump is necessary to incorporate the electromagnet and the required oscillating path of the oscillating arm. Another form of diaphragm pump disclosed in German Gebrauchsmuster Specification No. 1,970,354 suffers from the same disadvantages.

The aim of the present invention therefore is to provide a diaphragm pump having a diaphragm movable to and fro by an oscillating arm driven by an electromagnet which, while economical to manufacture, is distinguished by an extremely compact, preferably flat, form of construction and by very low noise production.

To this end, according to this invention, in such a pump the oscillating arm is mounted so that it oscillates in a plane which is perpendicular to the principal lines of force of the magnetic field produced by the electromagnet and parallel to pole faces of the electromagnet.

With this arrangement the electromagnet and oscillating arm of the diaphragm pump are arranged, not in the usual manner, but out of phase with each other, that is to say, when the electromagnet is excited, the oscillating arm does not move to and fro generally along the axis of the core of the electromagnet but perpendicularly thereto, and also along the pole surfaces of the electromagnet. As a result, the pump can be constructed to have an extremely flat form and a very low noise level. It has surprisingly been found that the diaphragm pump in accordance with the invention, with the oscillating arm swinging perpendicularly to the principal lines of force of the magnetic field, possesses a substantially lower noise level even than the known diaphragm pumps, wherein the oscillating arm swings between the poles of the electromagnet. This is possibly attributable to the more favourable construction and arrangement of the oscillating arm with the increased natural frequency effect thereby obtained.

Preferably, the electromagnet has a core which is attached to an elongated base plate and has its pole faces facing in the longitudinal direction of the base plate. This results in especially favourable space utilisation on the base plate.

The core of the electromagnet can be constructed in any desired manner, but especially favourable results have been obtained with a core which is substantially E-shaped. A core of this shape produces the advantage that the oscillating arm, which may be mounted through a leaf-spring on a bearing block projecting from the base plate, can have, on its end adjacent the core, an armature of approximately the same width as the core.

An oscillating arm, which has optimum oscillating characteristics and which can be adapted with regard to its weight to various thicknesses and stiffnesses of the diaphragm which it moves, may be provided by making the arm of trapezium shape in a plane perpendicular to its direction of oscillation, the arm tapering in width towards the magnet and having a rectangular armature formed rigidly at its end adjacent the magnet.

This form of the oscillating arm possesses a high elasticity in the direction of oscillation, which is advantageous for low-noise operation, and the requirement is satisfied that the weight of the armature can be adapted to the thickness and stiffness of the diaphragm. To adapt the weight of the armature in this way, the armature preferably consists of a packet of laminations, one lamination of which is integral with the oscillating arm. It has proved of advantage, in order to attain higher pressures, for the oscillating arm to form an outer one of the laminations in the packet. The arm preferably forms the bottom lamination of the packet.

There are various possible methods of constructing the armature, especially at its side adjacent the core of the electromagnet. In one preferred construction, a forward edge, adjacent the core, of the armature extends straight along the pole faces of the arms of the E-shaped core. The forward edge of the armature facing towards the core may however also have projections which extend into spaces between arms of the E-shaped core which project beyond the excitation coil of the electromagnet. This form of construction makes it possible to cause the arms of the electromagnet core to project beyond the excitation coil, so that the ratio of the volume of iron in the electromagnet core to copper in the excitation coil can be increased. It is thus possible for the diaphragm pump to be made cheaper overall, as a result of a 30 to 40% saving in copper wire for the excitation coil.

A further reduction in noise can be achieved by connecting the excitation coil at the one end of its winding to the output of a half-wave rectifier, the input of the rectifier and also the other end of the winding of the excitation coil being arranged to be connected to an alternating current supply. The half-wave rectifier allows only one, either the positive or negative, half-wave of the alternating current to pass, so that the oscillating arm is impelled only in synchronism with this half-wave, and thus its oscillation frequency is reduced to one half of the A.C. supply frequency.

A further reduction in noise and also simplification in construction is achieved by having the diaphragm of the diaphragm pump directly attached to the upper face, which carries the electromagnet core, of the base plate. This enables a pump body, which is otherwise necessary for housing or mounting the diaphragm, to be omitted. The fixing of the diaphragm which is preferably cap-shaped, is carried out at a flattened edge to the base plate, preferably by means of a fixing ring. This has the advantage that inlet and outlet valves, surrounded by the diaphragm, can be disposed directly on the base plate, thus leading to a further simplification in construction of the pump as a whole.

It has furthermore been found to be especially advantageous for the outlet valve to communicate with a pressure chamber disposed on the underside of the base plate and for the inlet valve to communicate with a suction chamber disposed on the underside of the base plate. The delivery and suction noises are still further reduced and damped by the provision of the pressure chamber and the suction chamber. The suction chamber can contain a filter.

The pressure chamber and the suction chamber, which may be open-bottomed, can be closed by a substantially L-shaped closure plate, with a sealing plate interposed between them. Futhermore, the pressure chamber may have an outlet connection leading to the upper side of the base plate. A tube leading to an outlet pipe may then be fitted to the outlet connection, the internal diameter of the tube preferably being smaller than the outlet cross-section of the outlet connection. This also enables a reduction in noise to be achieved.

Further, a housing is preferably provided. This surrounds the base plate which supports the electromagnet, the diaphragm and the oscillating arm on its upper face and carries the chambers on its lower face. This housing may form a chamber connected upstream of the suction chamber, in which the noise is still further reduced.

Two examples of diaphragm pumps constructed in accordance with the invention will now be described with reference to the accompanying drawings, in which.

Figure 1:
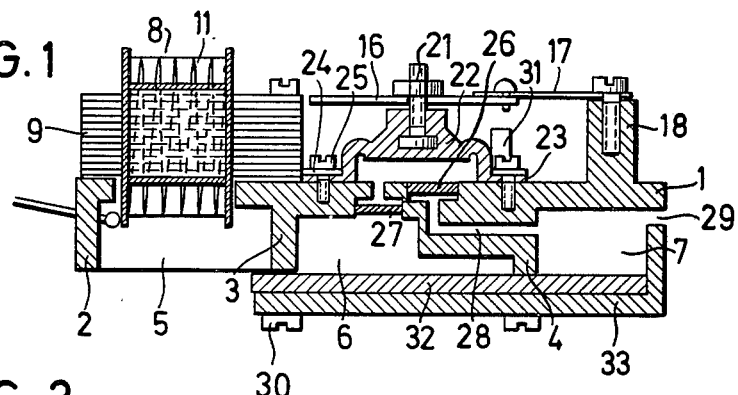
FIG. 1 is a section through a first example on the line I—I of FIG. 2.
Figure 2:
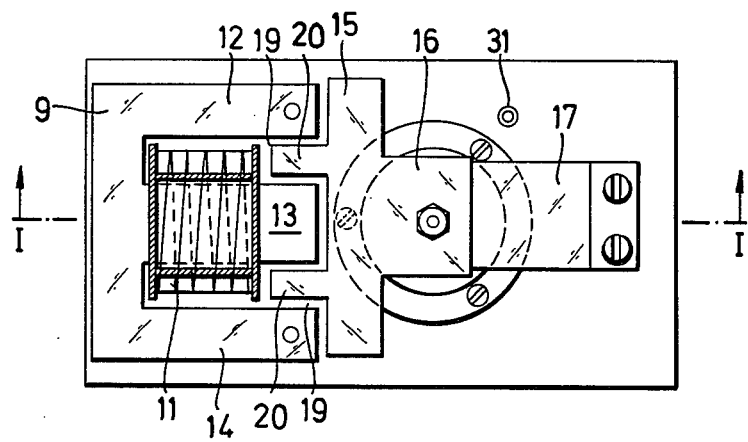
FIG. 2 is a plan of the example shown in FIG. 1.
Figure 3:
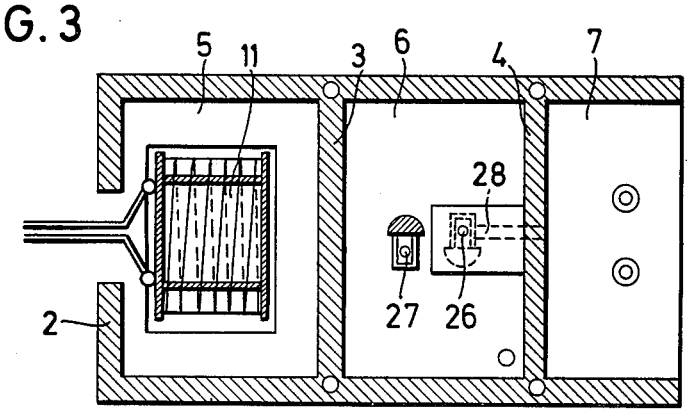
FIG. 3 is an underneath plan of the example shown in FIG. 1.

The first example of the diaphragm pump illustrated in FIGS. 1 to 3 comprises a base plate 1 with transversely extending partitions 2, 3 and 4 on its underface forming chambers 5, 6 and 7 between them. The chamber 5 contains electrical components described below, while the chamber 6 is an air pressure chamber and the chamber 7 is an air suction chamber, the functions of which are explained in more detail below.

Figure 3A:
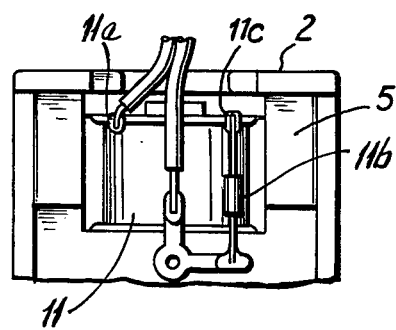
FIG. 3A is a partial underneath plan similar to FIG. 3 but illustrating the connection of the excitation coil including a half-wave rectifier.

In the region of the chamber 5, an electromagnet 8 is mounted on the upper side of the base plate 1. The electromagnet 8 comprises a laminated core 9, consisting of layers of metal sheets, and also an excitation coil 11. The excitation coil 11 is, in use of the pump, connected at one end 11c of its winding through a half-wave rectifier, 11b, and at the other end 11a of its winding directly, to an alternating current supply, note FIG. 3A. As can be seen from FIG. 2, the magnet core 9 is substantially E-shaped and has three arms 12, 13 and 14. The excitation coil 11 is on the middle arm. An armature 15 of an oscillating arm 16 co-operates with the magnet core 9, the arm being mounted through a leaf-spring 17 on a bearing block 18 of the base plate 1, so that it can oscillate. As can be seen from FIG. 2, the armature 15 has projections 20, which extend into spaces 19 between the arms 12, 13 and 14 of the magnet core 9. On the underside of the oscillating arm 16, a diaphragm 22 is fixed by means of a fixing journal 21. The diaphragm 22 is connected directly to the base plate 1 in an airtight manner at its flattened edge 23 by means of a fixing ring 24 and screws 25. In the vicinity of the diaphragm 22, an inlet valve 26 and an outlet valve 27 are mounted directly in the base plate 1. The inlet valve 26 is in communication, via an L-shaped duct 28, with the suction chamber 27, while the outlet valve 27 is open to the pressure chamber 6. In the suction chamber 7 there is a further intake opening 29, and the pressure chamber 6 has an outlet connection 31 leading to the upper side of the base plate 6.

As can be seen from FIG. 1, the pressure chamber 6 and the suction chamber 7 are closed in an airtight manner by a sealing plate 32 and a substantially L-shaped closure plate 33. The closure plate 33 is detachably fixed by means of screws 34 and the partitions 3 and 4 to the base plate 1.

When the electromagnet 8 is excited, the oscillating arm 16 swings perpendicularly to the principal lines of force of the magnetic field extending between the pole surfaces of the magnetic core 9, that is in the first example illustrated, along the pole faces of the arms 12, 13, 14 of the magnet core, and towards and away from the base plate 1. This causes the diaphragm 22 to be set in motion and the pumped fluid, which in this example is air, is drawn out of the suction chamber 7 via the duct 28 and the inlet valve 26, and is discharged through the outlet valve 27 into the pressure chamber 6 and thus into the outlet connection 31, whence the air is further conducted via a tube, not shown in FIGS. 1 to 3, to an outlet pipe.

Figure 4:
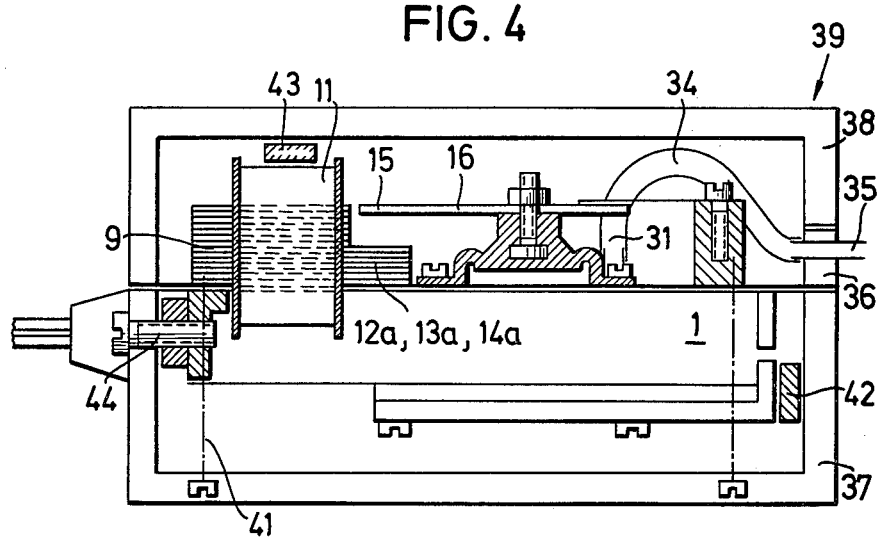
FIG. 4 is a section through the second example.
Figure 5:
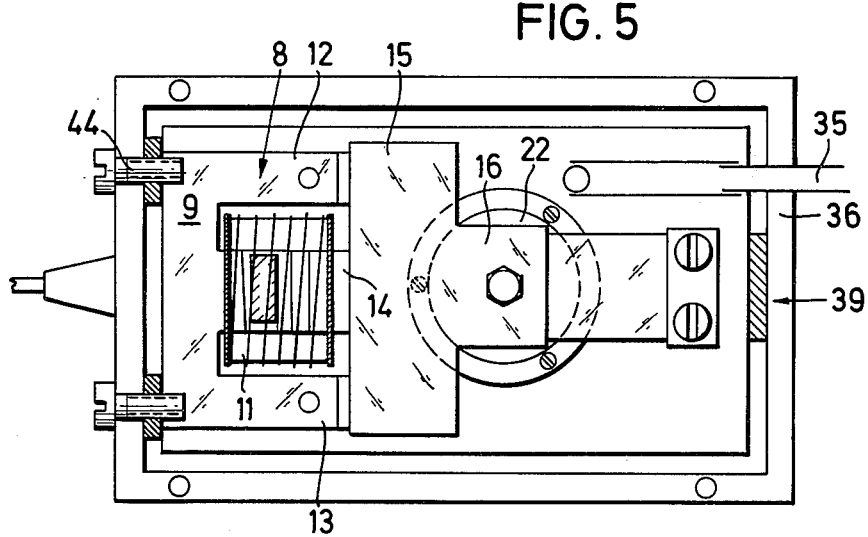
FIG. 5 is a plan of the second example shown in FIG. 4.

The second example shown in FIGS. 4 and 5, is fundamentally the same as the first example. The basic difference is that the armature 15 of the oscillating arm 16 of the second example does not have, at its end adjacent the electromagnet, any projections as in the first example, but is formed straight. As in the first example, the width of the armature 15 extends substantially over the entire width of the magnet core 9. Also, in the second example, the arms 12, 13, 14 of the magnet core 9 do not project into the oscillating path of the oscillating arm 16, but instead the arms 12, 13, 14 finish approximately flush with the excitation coil 11. However, as is indicated in FIG. 4 by reference numerals 12a, 13a, 14a, the arms extend forwards in the lower part of the laminated package forming the arms to below the end of the oscillating arm adjacent the pump body. By this measure, an especially large pumping stroke is achieved. In addition, a tube 34 is connected to the outlet connection 31 and leads to an outlet pipe 35. The pipe 35 is housed in a vertical projection 36 of the lower half 37 of a housing 39, the uper half of which is referenced 38. The internal diameter of the tube 34 is preferably smaller than the aperture in the outlet connection 31, so that when the delivered air passes through it, damping of any pressure fluctuations in the air occurs. The two halves 37, 38 of the housing 39 are releasably connected together by screws 41, extending along the sides of the two halves. The housing 39 constitutes a chamber surrounding the pump mechanism, and assists in producing a further reduction in noise. Elastic inlays 42, 43, which are disposed between the base plate 1 and the housing 39 and between the excitation coil 11 and the housing 39, also contribute to noise reduction. Finally, the base plate 1 is screwed by screws 44 to the lower half 37 of the housing 39. These screws 44 serve for setting and adjusting the entire diaphragm pump inside the housing 39.

Figure 6:
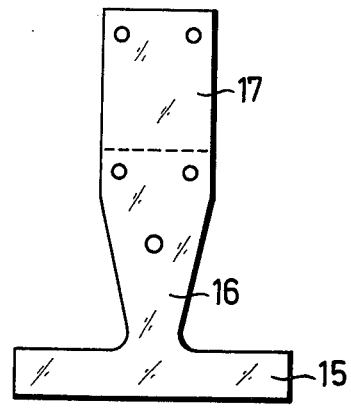
FIG. 6 is a plan view of a preferred form of oscillating arm which can be substituted for the arms shown in the illustrated examples.

As shown in FIG. 6, the preferred form of oscillating arm 16 has a trapezium shape in a plane perpendicular to its plane of oscillation with a transition at its narrower end into an armature 15, which is rectangular in this plane. At its other end the arm is connected by a leaf-spring 17 to a bearing block (not shown), so that it can oscillate. An especially high elasticity of the oscillating arm in its direction of oscillation is achieved by lightening the arm by its taper towards its free end, that is the end adjacent the magnet.

Figure 7:
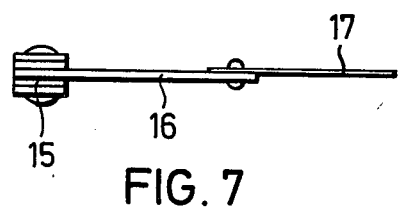
FIG. 7 is a side view of an oscillating arm similar to that shown in FIG. 6, but with a laminated armature at its free end; and, FIG. 8 is a side view similar to FIG. 7, but of a slightly modified arm.

FIG. 7 shows an oscillating arm 16 with a lamination packet of an armature 15 attached thereto and the fixing of a leaf-spring 17 to the arm can be clearly seen. The laminated armature 15 can be adapted in its weight highly accurately and simply to the thickness and stiffness of the diaphragm to be moved by the arm, by changing the number of laminations, so that an especially effective performance, accompanied nevertheless by low-noise operation, of the diaphragm pump is ensured with a long working life.

Figure 8:
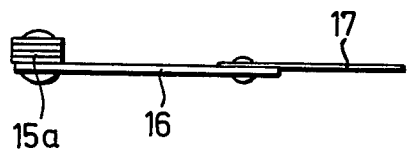

FIG. 8 shows a modification of the arm shown in FIG. 7. The modification is adapted in an optimum manner with regard to its performance. Here, a lamination packet forming an armature 15a is provided only on one face of the oscillating arm, so that a higher pressure can be produced and a higher efficiency attained. With this arrangement, the position of the oscillating arm 16 is so adjusted in relation to the core of the magnet that, in its at-rest state, it is situated with its free end at the same level as the upper face of the packet of core laminations.

As a result of this especially advantageous oscillating arm construction, a still further reduction in the noise level of the pump is attained and thus extremely quiet operation of the diaphragm pump is ensured.

The diaphragm pump which is shown in the examples as a pressure pump, may also be operated as a suction pump. Also, the suction chamber can be constructed as a filter chamber, for example by fitting it with a filter felt at a distance from the suction opening 29. The diaphragm pump in accordance with the invention is suitable not only for aerating aquaria, but also for medical and industrial appliances wherever it is important to have a low level of noise.

I claim:

1. A diaphragm pump having means including a diaphragm defining a pumping chamber, an arm mounted for oscillating movement, means connecting said arm to said diaphragm and electromagnet means for oscillating said arm to move said diaphragm to and fro, said elctromagnet means including core means having pole faces and coil means adpated, when energized, to produce a magnetic field including principal lines of magnetic force and said arm being mounted for said oscillating movement in a plane which is perpendicular to said principal lines of magnetic force and parallel to said pole faces, a half-wave rectifier having an input and an output, an alternating current supply, means connecting said input to said alternating current supply, means connecting one end of said coil means to said output and means for connecting the other end of said coil means to said alternating current supply.

2. A diaphragm pump as claimed in claim 1, further comprising an elongated base plate and means mounting said electromagnet means on said base plate with said pole faces of said core means facing longitudinally of said elongated base plate.

3. A diaphragm pump as claimed in claim 2, wherein said oscillating arm is mounted by means including a bearing block projecting from said base plate, a leaf-spring fixed at one end to said bearing block and means fixing said arm to the opposite end of said leaf-spring, and further comprising an armature of substantially the same width as said core means mounted on said arm at the end thereof adjacent said electromagnet means.

4. A diaphragm pump as claimed in claim 3, in which said armature has a forward edge adjacent said core means and said armature further comprises projections extending from said forward edge into spaces between arms of said E-shaped core means, said arms of said E-shaped core means projecting beyond said coil means.

5. A diaphragm pump as claimed in claim 2, further comprising means directly fixing said diaphragm to an upper face of said base plate.

6. A diaphragm pump as claimed in claim 5, wherein said diaphragm is top hat-shaped and includes a peripheral flange, and further comprising a securing ring fixing said flange to said base plate.

7. A diaphragm pump as claimed in claim 5, further comprising an inlet valve and an outlet valve communicating with said pumping chamber, and means mounting said inlet valve and said outlet valve in said base plate adjacent said diaphragm.

8. A diaphragm pump as claimed in claim 7, further comprising means defining a pressure chamber on the underside of said base plate and means defining a suction chamber on the underside of said base plate, said outlet valve communicating with said pressure chamber and said inlet valve communicating with said suction chamber.

9. A diaphragm pump as claimed in claim 8, further comprising L-shaped duct means communicating said inlet valve with said suction chamber.

10. A diaphragm pump as claimed in claim 8, wherein said pressure chamber and said suction chamber extend over substantially the whole width of said base plate.

11. A diaphragm pump as claimed in claim 8, further comprising an L-shaped closure plate and sealing plates, said L-shaped closure plate closing said pressure chamber and said suction chamber and said sealing plates being interposed between said L-shaped closure plate and said means defining said pressure chamber and said suction chamber.

12. A diaphragm pump as claimed in claim 8, further comprising a filter means contained in said suction chamber.

13. A diaphragm pump as claimed in claim 8, further comprising means defining an outlet connection leading from said pressure chamber to an upper face of said base plate.

14. A diaphragm pump as claimed in claim 13, further comprising an outlet pipe and a flexible tube, said flexible tube being attached to said outlet connection and communicating said outlet connection with said outlet pipe.

15. A diaphragm pump as claimed in claim 14, wherein said flexible tube has an internal diameter smaller than the outlet cross-section of said outlet connection.

16. A diaphragm pump as claimed in claim 2, further comprising means including partitions defining chambers on the underside of said base plate and a portion of said coil means and electrical connections for said coil means being disposed in one of said chambers.

17. A diaphragm pump as claimed in claim 16, further comprising housing means surrounding said base plate, said electromagnet means, said diaphragm, said oscillating arm and said chambers.

18. A diaphragm pump as claimed in claim 17, wherein said housing means includes two parts and means screw-threadedly connecting said two parts to form said housing.

19. A diaphragm pump as claimed in claim 17, further comprising elastic inlay means disposed between said housing and said coil means.

20. A diaphragm pump as claimed in claim 17, further comprising elastic inlay means disposed between said base plate and said housing.

21. A diaphragm pump as claimed in claim 17, further comprising means detachably fixing said base plate to one end face of said housing.

22. A diaphragm pump as claimed in claim 1, wherein said core means is substantially E-shaped.

23. A diaphragm pump as claimed in claim 22, wherein said E-shaped core means is formed by a package of laminations and projections formed by said laminations extend from arms of said E-shaped core means in the vicinity of said pole faces, but outside the path of said oscillating movement of said arm, said projections extending laterally of said arm in the vicinity of the end of said arm adjacent said core means.

24. A diaphragm pump as claimed in claim 1, wherein said oscillating arm is of trapezium shape in a plane perpendicular to the plane of oscillation thereof, said arm tapering inwardly towards said electromagnet means and further comprising an armature which is of rectangular shape in said plane perpendicular to said plane of oscillation, said armature being rigid with the end of said arm adjacent said electromagnet means.

25. A diaphragm pump as claimed in claim 24, wherein said armature includes a packet of laminations, one of said laminations being integral with said arm.

26. A diaphragm pump as claimed in claim 25, wherein said one of said laminations which is integral with said arm is an outer lamination in said packet.

* * * * *